United States Patent

[11] 3,607,827

| [72] | Inventors | Andrew Anthony Dukert<br>Ambler;<br>Alkis Christofas, Philadelphia, both of Pa. |
|---|---|---|
| [21] | Appl. No. | 799,084 |
| [22] | Filed | Feb. 13, 1969 |
| [45] | Patented | Sept. 21, 1971 |
| [73] | Assignee | Pennwalt Corporation<br>Philadelphia, Pa. |

[54] VINYLIDENE FLUORIDE POLYMER COMPOSITIONS
10 Claims, No Drawings

[52] U.S. Cl. ................................................. 260/41,
117/132 CF, 117/148, 117/161 UZ, 260/41 B,
260/884, 260/900
[51] Int. Cl. ..................................................... C08f 45/04,
C09d 3/76

[50] Field of Search ........................................... 260/41 B,
884, 900; 117/161 UZ

[56] References Cited
UNITED STATES PATENTS

| 2,377,095 | 5/1945 | Muskat ........................ | 260/78.4 |
| 3,125,546 | 3/1964 | Pinner et al .................. | 260/884 |
| 3,340,222 | 9/1967 | Fang ............................. | 260/41 |

*Primary Examiner*—Allan Lieberman
*Assistant Examiner*—J. H. Derrington
*Attorneys*—Carl A. Hechmer, Jr. and Stanley Litz

ABSTRACT: A resin composition comprising a blend of from about 50 to 99 weight percent of vinylidene fluoride polymer and 1 to 50 weight percent of diallyl phthalate monomer or prepolymer is useful in preparing a coating having high softening point, good heat stability and solvent resistance.

VINYLIDENE FLUORIDE POLYMER COMPOSITIONS

The present invention relates to vinylidene fluoride polymer compositions having improved physical and performance properties. More particularly, this invention concerns a vinylidene fluoride polymer composition containing a modifying amount of diallyl phthalate polymer, the mixture being especially useful as a coating for various substrates.

Vinylidene fluoride polymers are recognized and used by the chemical industry, construction industries, and related industries as high-performance resin coatings. In certain applications, however, polyvinylidene fluoride resin coatings are found to certain solvents, a lower than desired softening point, and inadequate heat stability in the presence of certain pigments. Because of the latter deficiency many of the applications for polyvinylidene fluoride which require a white titanium dioxide pigment are restricted because discoloration of the composition occurs under the relatively rigorous thermal conditions to which vinylidene fluoride polymers are subjected. This invention alleviates the foregoing deficiencies by providing a modified polyvinylidene fluoride resin composition having greater heat stability, higher melting point, better solvent resistance and more resistance to discoloration that the previously known polyvinylidene fluoride resin compositions.

The novel composition of this invention is comprised of a blend of from about 50 percent to about 99 percent by weight of vinylidene fluoride polymer and correspondingly from about 1 percent to 5 percent by weight of diallyl phthalate polymer. The preferred range of the diallyl phthalate polymer modifier is from about 1.5 percent to about 12 percent, especially in pigment-containing compositions. In another aspect of this invention, the composition contains from about 20 to about 50 parts by weight of $TiO_2$ pigment per 100 parts by weight of the foregoing combined resins.

A brief but comprehensive survey of polymerization techniques used in preparing vinylidene fluoride polymers embodied in the composition of this invention is found in the specifications of U.S. Pat. No. 2,435,537 to Ford et al. and No. 3,193,539 to M. Hauptschein. The terms "vinylidene fluoride polymer" and "polyvinylidene fluoride" used herein refer not only to the homopolymer of vinylidene fluoride, but also to the vinylidene fluoride copolymers containing at least about 75 mol percent of vinylidene fluoride. Suitable comonomers are the halogenated ethylenes such as sym. - dichlorodifluoroethylene, 1-chloro-1, 2, 2-trifluoroethylene, tetrafluoroethylene, hexafluoropropene, vinyl fluoride, vinyl chloride and the like. When at least about 75 mol percent of vinylidene fluoride is present, the important chemical resistance, resistance to the deteriorative effects of the sun and weather, and mechanical characteristics of the copolymers of vinylidene fluoride are essentially the same as the homopolymer. The primary particle sizes of the particulate polyvinylidene fluoride in the formulations herein described are, in general, within the range of about 0.05 micron to about 1 micron in diameter. However, these particles are present in the dispersion described below as agglomerates containing from one to about 35 primary particles, preferably from one to 10 particles per agglomerate.

The diallyl phthalate polymer constituting the essential modifying resin embodied in the composition of this invention may be derived from diallyl orthophthalate, diallyl isophthalate (metaphthalate), or diallyl terephthalate (paraphthalate) monomer, the partially polymerized prepolymers thereof, or mixtures thereof. The solid prepolymers are linear, low molecular weight, internally cyclized structures containing unreacted allylic groups spaced at regular intervals along the polymer chains. The prepolymers are prepared by arresting polymerization of the allyl phthalate monomer short of the point where intermolecular cross-linking and gelation occur. (U.S. Pat. No. 3,030,341 to P.E. Willard describes the preparation of such prepolymers in detail).

The desired amount of the diallyl phthalate monomer, prepolymer or mixture is admixed with the other components of the coating formulation (i.e., vinylidene fluoride polymer, latent solvent, pigment, etc., the phthalate monomers and prepolymers normally being soluble in the dispersion solvents) together with an effective amount of a free-radical catalyst to catalyze the subsequent polymerization of the phthalate monomer or prepolymer. The amount of free-radical catalyst is, in general, from about 1 to about 6 percent based on the weight of the diallyl phthalate involved. Representative of operative catalysts are peroxides such as sodium, potassium and ammonium persulfates, caprylyl peroxide, benzoyl peroxide, dicumyl peroxide, pelargonyl peroxide, cumene hydroperoxides, tertiary butyl diperphthalate, tertiary butyl perbonzoate, sodium peracetate, sodium percarbonate and the like, as well as azobisisobutyronitrile and others. Preferred, however, are the organic peroxides.

The usual method of utilizing the composition of this invention is to prepare films and coatings on a substrate from a nonaqueous dispersion of polyvinylidene fluoride in an organic latent solvent containing in solution the diallyl phthalate monomer or prepolymer and catalyst therefor, with the pigment, if desired, homogeneously mixed with the dispersion. A latent solvent is defined in the art as an organic liquid having a boiling point (at atmospheric pressure) above about 50° C., preferably about 100–300° C., which liquid has no significant solvent or swelling action on polyvinylidene fluoride at room temperature, but at an elevated temperature exerts a solvent action sufficient to cause the vinylidene fluoride polymer particles to coalesce. Representative latent solvents include tetraethylurea, dimethyladipate, diethyladipate, diethylsuccinate, dimethylphthalate, diethylphthalate, diethyloxalate, triethylphosphate, diethylformamide, dimethylsebacate, dimethylsuccinate, propylene carbonate, ethylene carbonate, gamma butyrolactone, 2-nitropropane, acetone, 4-methoxy-4 methyl pentanone-2, isophorone, methyl ethyl ketone, cyclohexanone, 2-methoxyethylacetate, 2-butoxyethylacetate, 2-ethoxyethylacetate, diethylene glycol monoethyl ether acetate, hexylacetate, diacetone alcohol and others well known in the art. In general, the quantity of the latent solvent in the polymeric dispersion will be in the range of from about 80 to about 300 parts by weight per 100 parts by weight of polyvinylidene fluoride. Obviously, the viscosity of the polymeric dispersion is decreased as the relative proportion of latent solvent therein is increased. If desired, other organic volatile diluents which have no latent solvating action on the vinylidene fluoride polymer may be added to reduce the dispersion viscosity, to improve the flow characteristics, and to promote the wetting action of the latent solvent on the polymer powder. The amount of the volatile diluent may be as much as up to about 100 parts per 100 parts by weight of the polyvinylidene fluoride. Examples of such nonsolvent diluents are xylene, toluene, diisobutylketone, aliphatic naphthas, aromatic naphthas, methyl isobutyl carbinol and others well known in the art. Viscosity of the dispersion can be further reduced by adding from about 0.01 to about 2 parts of a cationic surfactant per 100 parts by weight of dispersion solids as disclosed in the application of F. F. Koblitz and R. G. Petrella, S. N. 520,849, filed Jan. 17, 1966, now U.S. Pat. No. 3,441,531, issued Apr. 29, 1969.

The aforesaid dispersions are conveniently prepared by mixing the substantially water-free, powdered vinylidene fluoride polymer, latent solvent, optional volatile solvent, the pigment if needed, the phthalate polymer precursor and catalyst in a suitable mixing apparatus such as a paint mill, sand mill, ball mill, rodmill, or a high-shear blending unit. Well-known techniques for laying down the coating composition involve applying the dispersion by spraying or dip coating, or by doctor blade or reverse roll coating to the substrate (e.g., metal, cloth, plastic, wood, glass, etc.). The coated material is inserted in an oven and dried and cured at from about 250° F. to about 650° F. At these elevated temperatures final polymerization and curing of the diallyl phthalate precursor takes place simultaneously with the fusion and curing of the matrix vinylidene fluoride polymer to leave a film comprised of this durable and compatible resinous mixture.

At the present time the polyvinylidene-fluoride-$TiO_2$ dispersions available on the market have incorporated therein a minor amount of an acrylic resin to inhibit discoloration (yellowing) of the coating when the films are subjected to high curing temperatures. It has been found that the compositions of this invention are markedly superior in their ability to resist discoloration while offering the additional advantages of better solvent resistance and increased thermal stability. These advantages are illustrated by the following examples which are exemplary only and should not be construed as limitative of the scope of the invention as described and claimed herein. In the examples all ingredients are measured in parts by weight and mixtures are defined by the weight percents of their components.

EXAMPLE 1 a. 100 parts of polyvinylidene fluoride power ("Kynar 501," a product of Pennsalt Chemicals Corporation) is dispersed with intensive agitation in a mixture of 80 parts of dimethyl phthalate and 20 parts of di-isobutyl ketone to give a dispersion comprised of 50 percent polyvinylidene fluoride powder and 50 percent solvents.

b. 100 parts of diallyl orthophthalate prepolymer ("Dapon 35," a product of Food Machinery Corporation) is dissolved in 120 parts of methyl isobutyl ketone. 5 parts of tertiary butyl-perbenzoate catalyst is mixed in.

c. Varying amounts of the foregoing catalyzed diallyl phthalate prepolymer solution (b) are added to separate portions of the polyvinylidene fluoride dispersion (a) and concentrations are adjusted by the addition of methyl isobutyl ketone to give polymer-solvent mixtures comprised of about 40 percent polymer and polymer precursor, and 60 percent solvents, wherein the constituencies of the compositions based on said total resin content only are as follows:

RESIN PROPORTIONS

| Sample No. | Diallyl Phthalate Prepolymer | Vinylidene Fluoride Polymer |
| --- | --- | --- |
| A | 0% | 100% |
| B | 2.4% | 97.6% |
| C | 5.9% | 94.1% |
| D | 11.1% | 88.9% |
| E | 20% | 80% |
| F | 33.3% | 66.7% |
| G | 50% | 50% |

Films (4 mils thick) are cast from the foregoing dispersions on polished chromium-plated brass plates and dried and cured for 15 minutes at 400° F. in an air circulating oven. The melting point, appearance, and flexibility of the cured films are noted. The observations are summarized in the following table:

| Sample No. | Appearance of Film | Melting Point, °C. | Flexibility |
| --- | --- | --- | --- |
| A | clear | 157 | good |
| B | hazy, transparent | 161 | good |
| C | translucent | 172 | good |
| D | hazy, translucent | 174 | good |
| E | milky | 193 | good |
| F | milky | 205 | fair |
| G | yellowish | >210 | relatively brittle |

EXAMPLE 2 a. 100 parts of $TiO_2$ pigment is vigorously dispersed in a mixture of 138 parts of diethylene-glycol-monoethyl-ether acetate and 46 parts of dimethyl phthalate. To this dispersion are added with high-speed stirring 108 parts of isophorone, 108 parts of butyrolactone and 300 parts of polyvinylidene fluoride powder.

b. Varying amounts of the catalyzed diallyl phthalate prepolymer solution described in example 1 (b) are added to separate portions of the polyvinylidene-fluroride-$TiO_2$ pigment dispersion (a) and adjusted by adding methyl isobutyl ketone to give mixtures containing about 12 percent pigment, 28 percent polymer and 60 percent solvent, wherein the constituencies of the compositions based on total resin content are as follows:

RESIN PROPORTIONS

| Sample No. | Diallyl Phthalate Prepolymer | Vinylidene Fluoride Polymer |
| --- | --- | --- |
| H | 0% | 100% |
| K | 1.5% | 98.5% |
| L | 3.5% | 96.5% |
| M | 6.5% | 93.5% |
| N | 12.5% | 87.5% |
| O | 24% | 76% |
| P | 35% | 65% |
| Q | 50% | 50% | c. 406.25 parts of a 40 percent solution of methylmethacrylate-ethylacrylate copolymer in toluene ("Acryloid B–44," predominently a methylmethacrylate polymer, a product of Rohm and Haas Company) is dissolved in a mixture of 1,250 parts of diethylene-glycol-monoethyl-ether acetate and 500 parts dimethyl phthalate. 58 parts of $TiO_2$ pigment is dispersed in 72 parts of this acrylic polymer solution. With this dispersion are mixed 50 parts isophorone, 50 parts butyrolactone and 103 parts of the previously described polyvinylidene evaluated powder to produce a dispersion comprised of 35 percent polymer, 15 percent pigment and 50 percent solvent, wherein the constituency of the composition based on total resin content is as follows:

RESIN PROPORTIONS

| Sample No. | Acrylic Polymer | Vinylidene Fluoride Polymer |
| --- | --- | --- |
| J | 5% | 95% |

Films (1.2 mils thick) are cast from the foregoing dispersions H through Q on aluminum plates and cured at 550° F. for 6 minutes, and the appearance of the films is noted. The solvent resistance of these pigmented coatings is evaluated by rubbing a ½-inch-thick felt pad soaked in dimethyl acetamide on the surface of the coating in a reciprocating motion at 2 strokes per second under a kilogram load. The results of the attack by this representative solvent are summarized in the following table:

| Sample No. | Color of Coating | Solvent Resistance Observations |
| --- | --- | --- |
| H | intense brownish discoloration | Coating partially removed after 20 strokes |
| J | Brownish discoloration | Coating completely removed after 15 strokes. |
| K | Slight trace of yellow | Coating partially removed after 20 strokes; significantly less removal than Sample H |
| L | No discoloration | Coating partially removed after 20 strokes; significantly |

Table—Continued

| | | less removal than Sample H |
|---|---|---|
| M | No discoloration | Coating partially removed after 20 strokes; significantly less removal than Sample H |
| N | Slight trace of yellow | Coating partially removed in spots after 20 strokes; less removal than Sample K. |
| O | Slight yellowish | Coating partially removed in spots after 20 strokes; less removal than Sample K. |
| P | Light yellowish | Very slight surface attack after 20 strokes |
| Q | Yellowish | Very slight surface attack after 20 strokes |

EXAMPLE 3

To demonstrate the improved heat resistance and color stability of the compositions of this invention, $TiO_2$-containing, vinylidene fluoride polymer coatings (1 mil thick) are cast side-by-side on a 1/32 inch aluminum panel from the dispersions identified above as sample J (containing 5 percent acrylic resin); sample H (no resin additive); and sample L (3.5 percent diallyl phthalate polymer). The films are cured for 1.25 minutes at 550° F. and 10 additional minutes at 600° F. The films show the following color characteristics:

| Sample No. | |
|---|---|
| H | Dark brown discoloration |
| J | Slight brown discoloration |
| L | No discoloration |

To demonstrate the improved weatherability of the composition of this invention, coatings from dispersions identified as sample J and sample L are cast on chromate-primed aluminum plates and cured at 550° F. for 1.5 minutes. The panels are exposed to the degradative action of a dew cycle weatherometer at 2 cycles/hour for 1,000 hours. Sample J panel shows some "chalking" of the pigment but sample L panel is apparently unaffected by the exposure.

EXAMPLE 4 a. 17.4 parts of $TiO_2$ (CLNC grade, Titanium Pigment Company) is dispersed in a mixture of 12.6 parts diethylene-glycol-monoethyl-ether acetate and 5 parts dimethyl phthalate by grinding in a ball mill.

b. 30.9 parts of polyvinylidene fluoride powder ("Kynar 500") is similarly dispersed in a mixture of 15 parts isophorone and 15 parts butryolactone.

The dispersions (a) and (b) are blended in a high-shear mixer. Weighed amounts of a resin modifier or a precursor resin modifier are thoroughly mixed with portions of the above base dispersion, except for a control to which no modifier is added. The compositions are as follows:

| Sample No. | Modifier | % Modifier based on Polyvinylidene fluoride |
|---|---|---|
| R | None | 0 |
| S | Methylmethacrylate polymer ("Acryloid B-44") | 5.5% |
| T | Diallyl isophthalate monomer containing 3% benzoyl peroxide as catalyst | 5.5% |
| U | One part diallyl orthophthalate prepolymer ("Dapon 35") to one part diallyl isophthalate containing 3% benzoyl peroxide | 5.5% |
| W | Diallyl metaphthalate monomer catalyzed with 3% benzoyl peroxide | 11% |

Films (1 mil) are cast side-by-side from the foregoing dispersions onto 1/32 inch aluminum plates. The heat and color stability of the coatings are determined by exposing the specimens to a temperature of 525° F. in a hot air-circulating oven, withdrawing comparative samples, and noting the residence time at which failure occurs as evidenced by discoloration. The results, showing the marked superiority of the compositions of this invention, are as follows:

| Sample No. | Stability |
|---|---|
| R | Failure in 3 minutes |
| S | Failure in 5 minutes |
| T | Slight discoloration after 5 minutes |
| U | Trace of discoloration after 5 minutes |
| W | No discoloration after 5 minutes |

What is claimed is:

1. A coated substrate prepared by mixing together a vinylidene fluoride polymer, a latent solvent, a component selected from the group consisting of diallyl phthalate monomer and prepolymer of diallyl phthalate, wherein the proportion of the diallyl phthalate component is from about 1 to about 50 percent based on the combined weight of said component and the vinylidene fluoride polymer, and a free-radical catalyst to form a coating composition; coating a substrate with said composition and heating the coating to produce a dried and cured film.

2. A coated substrate according to claim 1 wherein the coating composition contains from about 20 to about 50 parts by weight of titanium dioxide per 100 parts by weight of the diallyl phthalate component and the vinylidene fluoride polymer.

3. A coated substrate according to claim 1 wherein the proportion of the diallyl phthalate component is from about 1.5 to about 12 percent based on the combined weight of said component and the vinylidene fluoride polymer.

4. A coated substrate according to claim 3 wherein the coating composition contains from about 20 to about 50 parts by weight of titanium dioxide per 100 parts by weight of the diallyl phthalate component and the vinylidene fluoride polymer.

5. A coating composition comprised of a dispersion in organic liquid solvent of vinylidene fluoride polymer and, in solution in said solvent, a component selected from the group consisting of diallyl phthalate monomer and prepolymers of diallyl phthalate, wherein the proportion of the diallyl phthalate component is from about 1 to about 50 percent based on the combined weight of said component and the vinylidene fluoride polymer and a free-radical catalyst.

6. A coating composition according to claim 5 having incorporated therein from about 20 to about 50 parts by weight of titanium dioxide pigment per 100 parts by weight of the diallyl phthalate component and the vinylidene fluoride polymer.

7. A composition according to claim 5 wherein the free-radical catalyst is present in an amount of about 1 to about 6 percent based on the weight of the diallyl phthalate component.

8. A coating composition according to claim 5 wherein the proportion of the diallyl phthalate component is from about 1.5 to about 12 percent based on the combined weight of said component and the vinylidene fluoride polymer.

9. A composition according to claim 8 having incorporated therein from about 20 to about 50 parts by weight of titanium dioxide pigment per 100 parts by weight of the vinylidene fluoride polymer and the diallyl phthalate component.

10. A composition according to claim 8 wherein the free-radical catalyst is present in an amount of about 1 to about 6 percent based on the weight of the diallyl phthalate component.